United States Patent [19]
Rusco

[11] 3,925,970
[45] Dec. 16, 1975

[54] LAWNMOWER

[76] Inventor: Easborn Rusco, 211 Westwood, Manhattan, Kans. 66502

[22] Filed: June 24, 1974

[21] Appl. No.: 482,000

[52] U.S. Cl. ............... 56/14.7; 74/218; 180/6.24; 180/74
[51] Int. Cl.$^2$ .................................... A01D 35/26
[58] Field of Search ....... 180/6.24, 6.26, 6.32, 6.34, 180/6.36, 6.4, 6.2, 6.66, 74; 74/218; 56/14.7, 16.9

[56] References Cited
UNITED STATES PATENTS

| | | | |
|---|---|---|---|
| 1,747,122 | 2/1930 | Lusse | 180/6.36 |
| 1,754,172 | 4/1930 | Lusse | 180/6.36 |
| 2,521,262 | 9/1950 | Smith | 180/6.2 |
| 2,903,081 | 9/1959 | Rudman | 180/74 X |
| 3,235,019 | 2/1966 | Peterson | 180/6.66 |
| 3,763,945 | 10/1973 | Danielson | 180/74 |

FOREIGN PATENTS OR APPLICATIONS

| | | | |
|---|---|---|---|
| 280,001 | 10/1963 | Australia | 180/74 |

*Primary Examiner*—Robert R. Song
*Assistant Examiner*—John A. Pekar
*Attorney, Agent, or Firm*—John H. Widdowson

[57] ABSTRACT

Improvement in the drive apparatus of a powered vehicle having a frame, a power device on the frame and a steering wheel assembly on the frame. The improvement in the drive assembly has a pair of drive wheels individually supported on the frame on pivotal mounts; a steering assembly connecting the steering wheel assembly individually to each of the drive wheel mounts to in use pivot the drive wheel mounts to disengage the drive wheel mount that is on the side toward which the vehicle is turned; a drive shaft operably connected to the power device and rotatably mounted on the frame with its end portions contacting the drive wheels when they are in a driving position. In a preferred specific embodiment the drive apparatus is provided with a forward drive assembly for forward vehicle motion having a pulley mounted on the drive shaft and a drive belt connecting it to the power device, and a reverse drive assembly for reverse vehicle motion having a drum or the like on the drive shaft, an idler pulley movably mounted on the frame and a drive belt connecting the idler pulley and the power device with the idler pulley being movable for moving the reverse drive belt into contact with the drum or the like.

5 Claims, 6 Drawing Figures

U.S. Patent   Dec. 16, 1975   Sheet 3 of 3   3,925,970
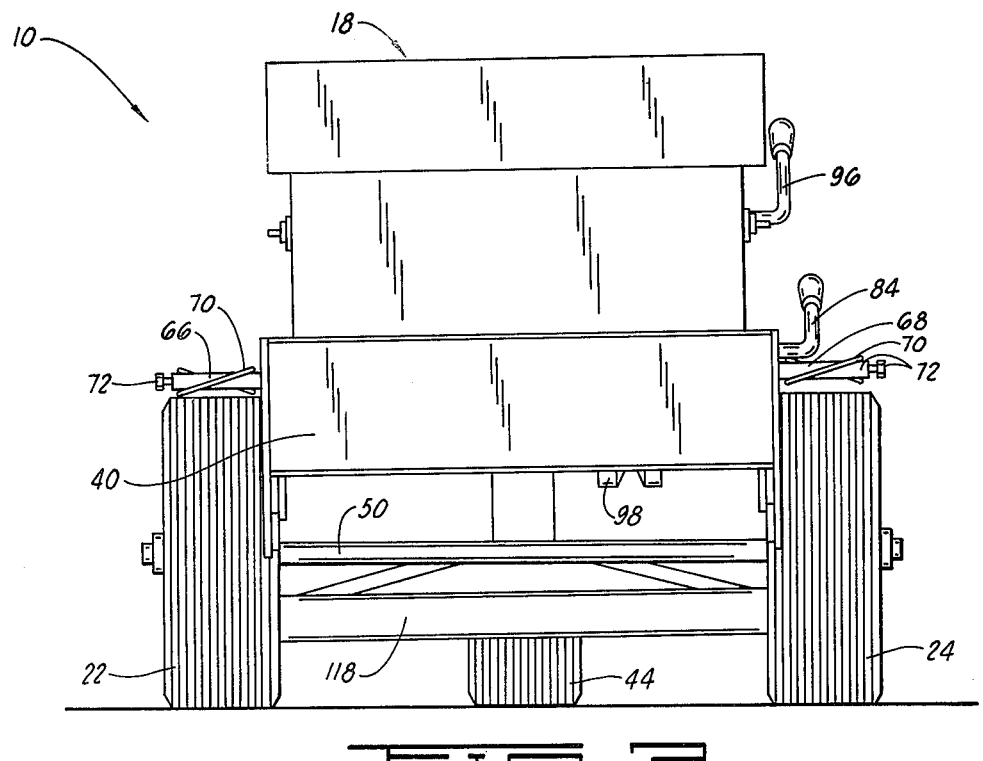
FIG-3
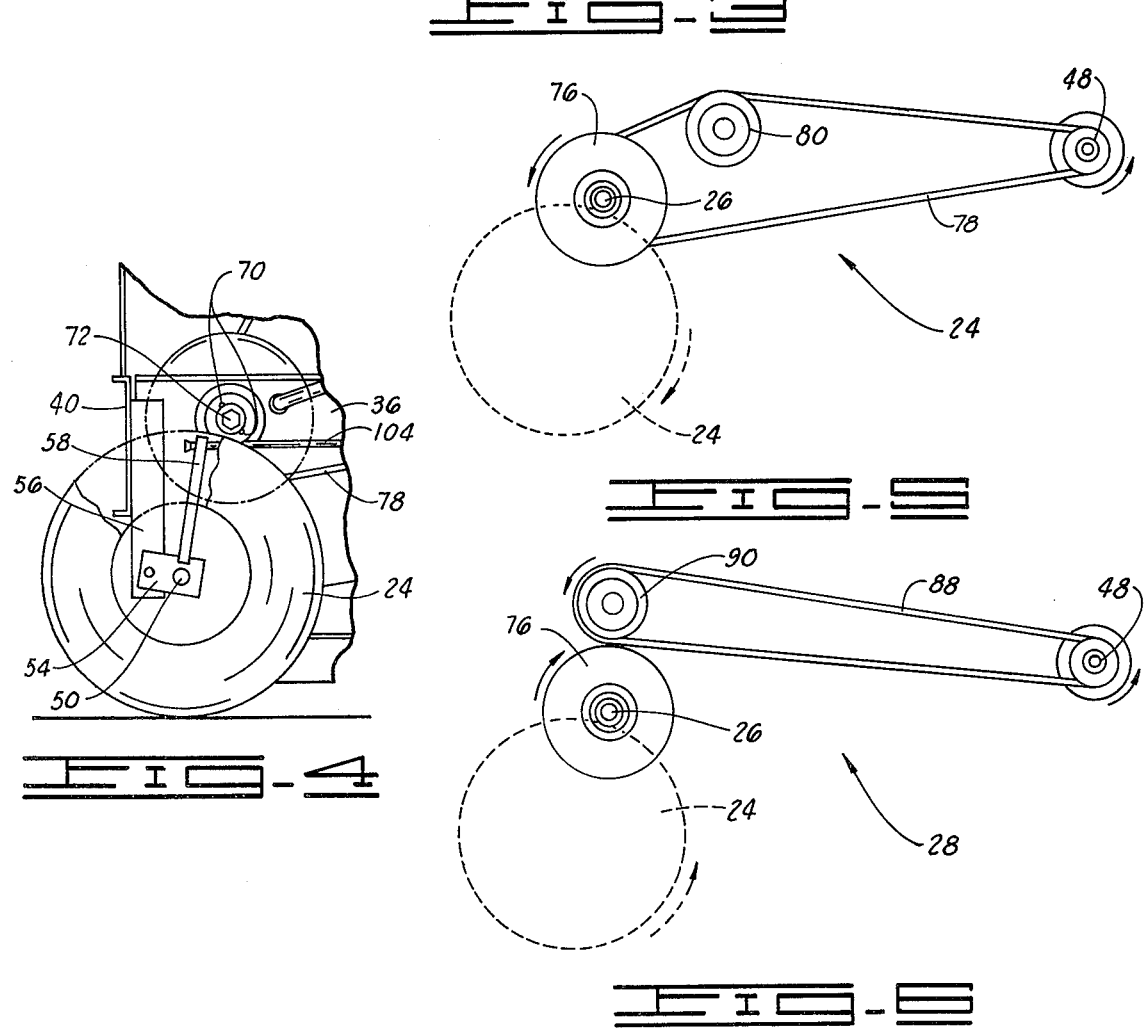
FIG-4
FIG-5
FIG-6

LAWNMOWER

BACKGROUND OF THE INVENTION

This invention is related to the drive apparatus for powered vehicles, such as lawnmowers, golf carts, and other small utility or pleasure vehicles which turn in a relatively small area. More particularly, the invention is related to drive systems for powered vehicles where both forward and reverse motion is required with the speed in one direction being variable, while the drive system receives power from a substantially constant speed rotary power source.

Numerous types of drive systems are known in the prior art which are adapted for use with riding lawnmowers, golf carts, and small pleasure vehicles; however, these devices utilize complex pulley and belt arrangements for connecting the engine, which is the usual power source, with a drive shaft that supports the drive wheels. These complex devices accomplish forward and reverse motion by using a gear box or a plurality of connected shafts, pulleys, belts and clutches that are alternately engagable with the engine to effect the forward or reverse motion of the drive wheels. Some of the known prior art devices have rotatable driven members which are supported on a linkage or the like with the rotatable drive members being alternately engagable with the perimeter of the drive wheels to effect the forward or reverse motion of the vehicle. These drive systems have quite a large number of moving parts and do not provide a significant frictional connection between the driving element and the drive wheel. None of the known prior art drive systems are constructed with an apparatus to vary the speed of the vehicle without considerable if not total reliance on the engine speed to accomplish such.

SUMMARY OF THE INVENTION

In a preferred specific embodiment of the improved vehicle drive assembly of this invention, such is shown and described here with a lawnmower. The lawnmower has a frame mounting an engine mounted with a steering wheel pivotally mounted on the front of the frame and a pair of driving wheels individually pivotally mounted on the rear of the frame and connected to the steering assembly so that as the steering wheel is turned from side to side the drive wheel which is on the inside of the turn is pivoted in a downward direction, disengaging same from a drive shaft which is rotatably mounted on the frame. The drive shaft is connected by the forward and reverse drive apparatuses with the engine. The forward drive assembly has a variable speed forward drive pulley mounted on the drive shaft, a drive belt connecting the forward drive pulley and the engine, a forward idler pulley pivotally mounted by a linkage on the frame and engaged with the forward drive belt for selectively tightening same to effect forward motion of the vehicle. The reverse drive assembly has a drum, a spool or the like rigidly mounted on the drive shaft, a reverse idler pulley pivotally mounted by a linkage on the frame and a reverse drive belt connecting the reverse idler pulley and the engine with the reverse idler pulley in use being movable to selectively move the reverse drive belt and bring it into contact with the peripheral portion of the drum, spool or the like to effect reverse motion of the vehicle. The end portions of the drive shaft which contact the driving wheels are specially constructed to frictionally engage the driving wheels.

One object of this invention is to provide an improvement in the drive means of a powered vehicle such as a lawnmower or the like overcoming the aforementioned disadvantages of the prior art devices.

Still one other object of this invention is to provide an improvement in the drive means for a powered vehicle such as a lawnmower, a golf cart, or other relatively small powered pleasure or utility vehicles where the drive system provides both forward and reverse motion and can effect turning of the vehicle in a substantially small area.

Still another object of this invention is to provide an improvement in the drive system for a powered vehicle such as a lawnmower, which is constructed with a pair of driving wheels, one on each side of the vehicle wherein the driving wheels are disengagable from their source of rotation as the vehicle is turned.

Yet another object of this invention is to provide a drive system wherein an essentially constant speed rotary power source can be utilized with the drive system to provide a variable speed control for the vehicle.

Various other objects, advantages, and features of the invention will become apparent to those skilled in the art from the following discussion, taken in conjunction with the accompanying drawings, in which:

DESCRIPTION OF THE DRAWINGS

FIG. 3 is a rear elevation view of the lawnmower with the right driving wheel thereof disengaged from the end portion of the drive shaft;

FIG. 4 is an elevation view of the right drive wheel portion of the lawnmower with the driving wheel in the disengaged position;

FIG. 5 is a pictorial diagram of the forward drive assembly in the engaged position with the driving wheel shown in dashed lines;

FIG. 6 is a pictorial diagram of the reverse drive assembly in the engaged position with the driving wheel shown in dashed lines.

Figure 1:
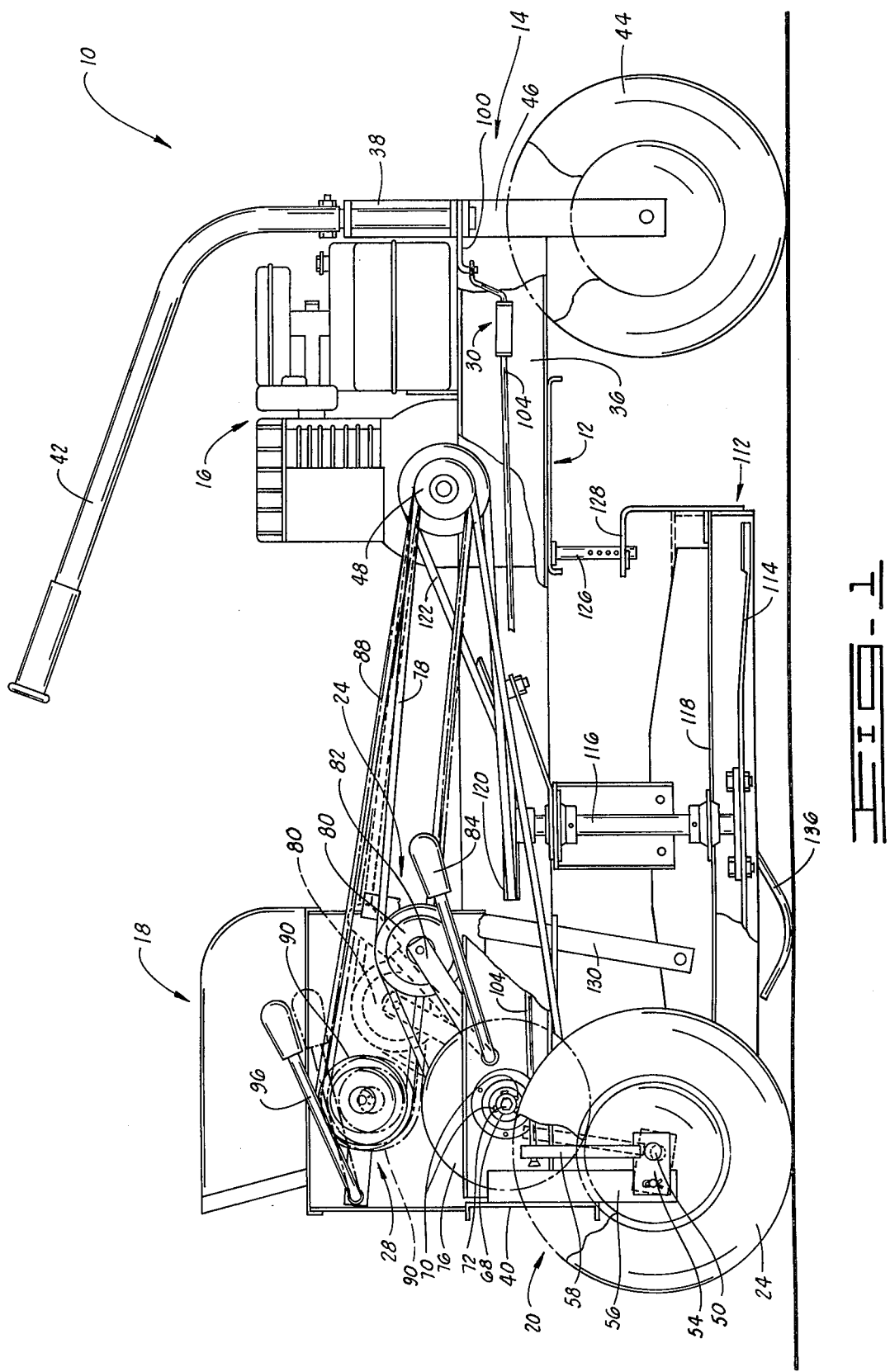
FIG. 1 is a side elevation view of the lawnmower with portions cut away for clarity and having the forward and reverse idler pulleys shown in solid lines in disengaged positions and in dashed lines in their respective engaged positions and with a drive wheel mount shown in dashed lines in a pivoted position.

The following is a description and discussion of preferred specific embodiments of the lawnmower and improved drive system for vehicles of this invention, such being made with reference to the drawings, whereupon the same reference numerals are used to indicate the same or similar parts and/or structure. It is to be understood that such discussion and description is not to unduly limit the scope of the invention.

DESCRIPTION OF PREFERRED EMBODIMENTS

Figure 2:
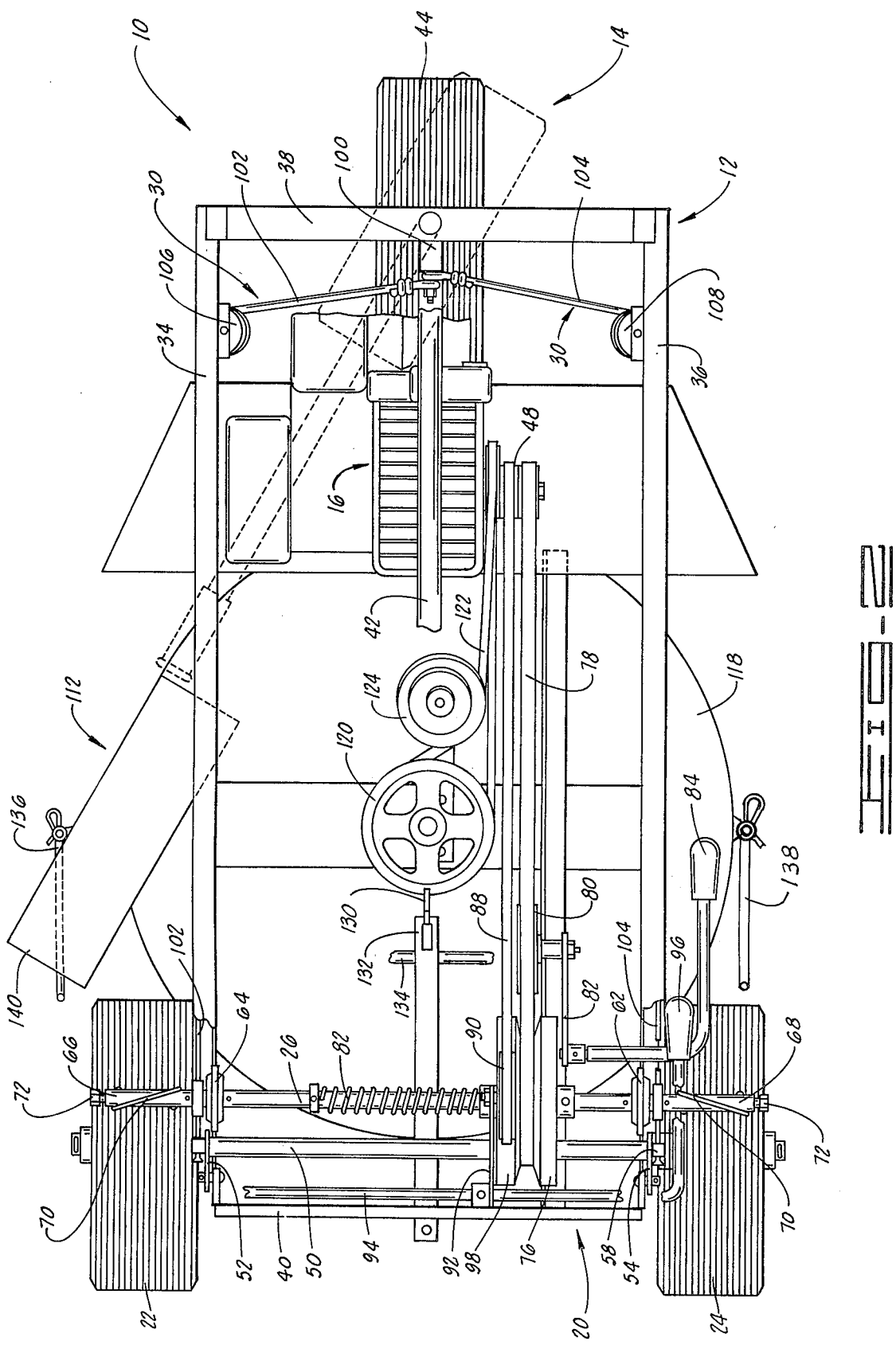
FIG. 2 is a top plan view of the chassis of the lawnmower including portions of the drive apparatus with the steering wheel and tiller shown in a turned position in dashed lines.

Referring to the drawings in detail and in particular to FIGS. 1 and 2, a lawnmower is indicated generally at 10, which embodies the improved drive apparatus of this invention. In the top and side views, portions of the lawnmower structure are removed for clarity. The lawnmower 10 is representative of a vehicle on which the improved drive apparatus of this invention can be used; it includes a chassis having a frame 12 with a steering assembly 14 on the forward end portion thereof. A motor or engine 16 is mounted on the forward portion of the chassis and a seat 18 is provided for a rider. The improved drive apparatus of this invention includes a drive wheel assembly indicated generally at 20 having a pair of driving wheels 22 and 24 individually pivotally mounted below the frame 12. A forward drive assembly, indicated generally at 24, connects the engine 16 and a drive shaft 26 which in use rotates the driving wheels 22 and 24. A reverse drive assembly, indicated generally at 28, is connected with the engine 16 and the drive shaft 26 to in use effect reverse motion of the vehicle. A variable speed pulley is provided for varying the forward vehicle speed. The steering assembly 14 includes a cable assembly 30 connecting the turnable support for the steering wheel individually with the mounts for the drive wheels 22 and 24 so that in use turning the steering wheel pivots the drive wheel mount which is disposed on the inside of the turning arc of the vehicle from the driving position to a position disengaging the drive wheel from the drive shaft 26.

The vehicle frame 12 has an elongated side members 34 and 36 connected on the forward end portion by a transverse member 38 and on the rear end portion by a rear transverse member 40. The steering assembly 14 includes a tiller 42 mounted through the forward transverse member 38 with forward wheel or steering wheel 44 supported in a yoke member 46 rigidly connected with the tiller 42. Moving the tiller 42 from side to side turns the steering wheel 44 relative to the chassis to effect turning of the vehicle. The engine 16 is mounted in the forward center portion of the vehicle and it is provided with a multiple groove pulley 48 mounted on its output shaft. In practice, the vehicle 10 has been operated with the engine 16 being a small single cylinder internal combustion engine and such has proven satisfactory for application of the drive system of this invention in this lawnmower application. The engine 16 can be provided with a governor to regulate or control the speed thereof to in use maintain the speed of the engine essentially constant for loaded and unloaded conditions. Any suitable rotary power device having sufficient power to operate the vehicle can be substituted for the internal combustion engine; for example an electric motor.

The drive wheel assembly 20 includes a pair of drive wheels 22 and 24 that are freely rotatably mounted on an axle 50. The axle is supported by the drive wheel mounts 52 and 54 which are pivotally mounted on the rear portion of the vehicle frame 12. FIG. 1 shows the lawnmower with the drive wheels in the driving position wherein the outer ends of the drive shaft rest on the upper portion of the drive wheels. The axle 50 is pivotally secured to the drive wheel mounts and the wheels 22 and 24 are freely rotatably mounted on its opposite end portions. The right side drive wheel mount 54 is shown in detail in FIGS. 1 and 4. Both of the drive wheel mounts are constructed similarly and in use function similarly. The drive wheel mount 54 is pivotally mounted on a vertically disposed frame member 56 that extends downward from the frame side member 36. The axle 50 is pivotally secured to the forward end portion of the wheel mount member 54 as shown in a position substantially spaced from its pivotal connection with the upright frame member 56. An arm-like member 58 extends generally upward from the forward end portion of the wheel mount member 54 as shown and it is connected in its upper end portion with one cable of the cable assembly 30. When the cable is pulled, the drive wheel mount 54 will rotate about its pivotal connection with the upright frame member 56 to a position approximately as shown in dashed lines in FIG. 1 which will displace the driving wheel 24 generally downward relative to the drive shaft 26, or from its drive position and disengage the peripheral portion of the drive wheel from the drive shaft 26.

The drive shaft 26 is rotatably mounted with the frame 12, with its opposite end portions extending outward beyond the frame 12 over the driving wheels. The drive shaft 26 is supported by bearings 62 and 64 where it passes through the frame 12. The opposite end portions of the drive shaft 26 are indicated at 66 and 68 and each is provided with a friction device for frictionally connecting the drive shaft and the peripheral portion of the drive wheels. The frictional devices are forced into contact with the peripheral portion of the drive wheels by the weight of the chassis and the weight of the rider. The frictional devices are on the end portions of the drive shaft and preferably have a spirally disposed wire member or the like 70 wrapped around the end portion of the shaft and secured thereto by a bolt 72 positioned in the end of the drive shaft. Each friction device has the wire or the like mounted through an aperture that is transverse to the elongated axis of the drive shaft 26 and wound around the outer end portion of the drive shaft in a spiral or helical fashion with the ends of the wire or the like inserted in another aperture that is transverse to the elongated axis of the drive shaft on its outer end portion and secured by a bolt or the like 72 substantially as shown. In practice, this frictional device has proven satisfactory in operation of the improved drive apparatus of this invention as applied to the lawnmower as shown. It is to be understood that the frictional device connecting the drive shaft and the driving wheels can be replaced by a suitable equivalent if desired.

The forward drive assembly 24 has a forward drive pulley 76 mounted on the drive shaft 26 and connected by a forward drive belt with one grooved portion of the engine pulley 48, and a forward idler pulley 80 engaged with the forward drive belt 78 and movably mounted on the vehicle frame 12. In use, the forward idler pulley 80 is moved to tighten the belt 78 on the pulleys 48 and 76. The forward drive pulley 76 is a variable speed pulley having one sheave secured to the drive shaft 26 and other sheave thereof translatably movably mounted on the drive shaft 26 and rotatably connected with the sheave that is secured to the drive shaft. A spring 82 mounted on the drive shaft 26 urges the movably mounted sheave in the direction of the sheave that is secured to the drive shaft so they cooperate to firmly hold the belt 76 therebetween. The forward idler pulley 80 is mounted on a lever actuated linkage that is mounted with the frame 12. The forward idler pulley 80 is mounted on the end of an arm 82 which is secured to one end of a generally L-shaped lever member 84 that extends through the frame 12 as shown. Raising and lowering the lever 84 correspondingly moves the forward idler pulley 80 which in turn tightens the belt 78 connecting the engine pulley 48 and the forward drive pulley 76. When the forward drive belt 78 is slack or not sufficiently tight to rotate the forward drive pulley 76, the forward idler pulley is in a position slightly below that shown in the solid lines of FIG. 1. A spring or other resilient member (not shown) can be provided connecting the chassis and the arm 82 or the lever 84 to position the forward drive assembly 24 in a neutral position when not engaged for use. The solid lines in FIG. 1 show the forward drive pulley in an intermediate position where the drive belt 78 is tightening and pulled into the outer portion of the forward drive pulley 76. The dashed lines in FIG. 1 show the forward idler pulley 80 in a substantially displaced position where the drive belt 78 is positioned in the inner portion of the forward drive pulley 76. Moving the forward drive pulley 80 by the lever 84 causes the drive belt 78 to be moved in its engaged position with the forward drive pulley 76 which in turn changes the rotating speed of the drive shaft 26 for a constant engine speed. FIG. 5 shows a simplified diagram illustrating rotation in the forward drive assembly 24. Arrows adjacent to the pulleys and wheel indicate direction of rotation of the pulleys and the wheel when the forward drive assembly 24 is engaged. Although the forward drive assembly 24 is constructed with the forward drive pulley 76 being a variable speed pulley, it is to be understood that the drive system can be constructed with the pulley not being a variable speed pulley without departing from the scope of the invention.

The reverse drive assembly 28 includes a reverse drive belt 88 looped around one groove of the engine pulley 48 on one end and on its opposite end supported by a reverse idler pulley 90. A linkage movably supports the reverse idler pulley 90 generally above one side of the variable speed forward drive pulley 76. The linkage has a generally L-shaped lever member 94 with an elongated portion that is mounted transversely with the frame 12, the arm 92 is secured to the elongated portion, and the shorter portion forms a handle portion 96 on the side of the vehicle as shown in FIGS. 1 and 2. Raising and lowering the handle 96 in turn moves or raises and lowers the reverse idler pulley 90 which in turn moves the reverse drive belt 88. The solid lines of FIG. 1 show the reverse drive assembly 24 in a neutral position with the handle 96 and the reverse idler pulley 90 in a raised position so the belt 88 is not in contact with the variable speed pulley 96. The dashed lines of FIG. 1 show the handle 96 and the reverse idler pulley 90 in a lowered position with the belt 88 in contact with the variable speed pulley 76. A spring or other resilient member (not shown) can be provided connecting the chassis and the arm 92 or the lever 96 to urge the reverse drive assembly 28 into a neutral position when not in use. The variable speed pulley 76 has a flanged portion 98 on one side thereof which forms a drum or the like to contact the exterior peripheral surface of the reverse drive belt 88 when the reverse drive assembly 28 is engaged. Although the variable speed forward drive pulley 76 as shown is constructed with a flanged portion suitable for engaging the reverse drive belt 88 it is to be understood that a separate drum, spool or the like can be mounted on the drive shaft 26 as a part of the reverse drive assembly 28 if desired. FIG. 6 shows the reverse drive assembly 28 in an engaged normal operating position with arrows adjacent to the pulleys and drive wheel to indicate their respective directions of motion.

The steering assembly 14 has a lug member 100 secured to the yoke 46 that supports the steering wheel 44. A pair of cables indicated at 102 and 104 each have one end secured to the lug 100 and their other ends connected with the drive wheel mounts 52 and 54. The cables 102 and 104 pass through the frame 12 and are supported and guided by pulley assemblies 106 and 108 respectively. The rear ends of the cables 102 and 104 are individually secured to the arm-like portions of the drive wheel mounts as shown in FIGS. 1 and 4. Turning the tiller 42 to the position shown in the dashed lines of FIG. 2 also turns the lug 100 and pulls cable 104 which rotates the wheel mount 54 to the displaced position generally as shown in the dashed lines in FIG. 1; this disengages the perimeter of the wheel 24 from the end portion of the drive shaft 26. With the tiller turned in the position shown in FIG. 2, the wheel 24 is on the inside of the turn and it is disengaged from the drive shaft 26 so that power is transmitted only to the opposite drive wheel 22 which is on the outside of a turn. When the tiller 42 is turned in the direction opposite to that shown in FIG. 2, then cable 102 is pulled taut and drive wheel 22 is disengaged from the drive shaft 26. As the drive wheels are disengaged from their respective ends of the drive shaft, the supporting axle 50 remains essentially parallel to the ground or other supporting surface and the frame 12 is tilted slightly relative to the axle.

A grass cutting blade assembly is mounted in the center portion of the vehicle and indicated generally at 112. Preferably, the grass cutting blade assembly 112 is a horizontally disposed rotary type cutter having a horizontally disposed blade 114 mounted on one end of a shaft 116 and covered in a housing 118 that is mounted below the frame 12. The shaft 116 has a pulley 120 mounted on the upper end thereof which is connected by a drive belt 122 and idler pulley 124 with a grooved portion of the engine pulley 48 so the blade 114 is rotated by the engine 16. A blade housing forward end support lug 126 is secured to a central portion of the frame 112 and it mounts a bracket 128 on the housing supporting same in a vertically adjustable relation. An upright arm 130 on the rear portion of the housing is engagable with a bracket 132 secured to a transverse member 134 on the frame 12. Preferably, the upper end of the arm-like member 130 is notched where it engages bracket 132 to provide for a vertical adjustment of the rear of the housing. A pair of vertically adjustable skids 136 and 138 are mounted on the opposed side portions of the housing 118. The skids 136 and 138 in use guide the housing 118 over the ground. The housing 118 has a grass discharge chute 140 on one side thereof directed toward the rear and away from the vehicle. If desired, the grass cutters idler pulley 124 can be constructed in a movable fashion so that operation of the grass cutter assembly 112 can be stopped when desired so the lawnmower can be driven without operating it.

In use and operation of the improved drive system of this invention with a lawnmower substantially as shown in the drawings such as in practice provides a lawnmower which operates quite satisfactorily. The advantages of the drive system of this invention become quite obvious when operating the lawnmower because it enables the vehicle to be stopped and started easily and turned in a quite small area. Also, the variable forward speed capability of the drive system enables it to be used in cutting the tall grass quite effectively because the engine can be operated at a relatively high speed with the forward drive assembly 24 being engaged to move the vehicle forward at a relatively slow speed. In the three-wheel configuration as shown, the vehicle is quite maneuverable, which is advantageous in mowing around shrubs, trees, and maneuvering into small spaces which would otherwise be inaccessible to the known prior art riding lawnmowers due to the large turning radius they usually require.

As will become apparent from the foregoing description of the applicant's improved vehicle drive system, relatively inexpensive and simple means have been provided to propel a small powered vehicle. The drive system is simple to operate, economical to manufacture, and can be used on vehicles such as the lawnmower shown herein as well as golf carts, small utility or pleasure vehicles, and other similar vehicles. The drive system is particularly well adapted for use with vehicles where the engine operates at a substantially constant speed such as a governed engine and where it is desirable to have a vehicle which can be moved at a variable speed.

While the invention has been described in conjunction with preferred specific embodiments thereof, it will be understood that this description is intended to illustrate and not to limit the scope of the invention, which is defined by the following claims.

I claim:

1. In a power-driven vehicle, having a frame, a power means mounted on the frame, and a steering wheel means pivotally mounted on the frame, the improvement comprising:
   a. a drive wheel means having a pair of drive wheels individually mounted on drive wheel mounts pivotally mounted on the frame, said drive wheel mounts individually pivotable in a downward direction from a driving position to a disengaged position; said drive wheel mounts secured to an axle and said axle has said drive wheels freely rotatably mounted thereon;
   b. a steering means connected individually to each of said drive wheel mounts with a pair of cables, said cable on the side toward which the vehicle is to be turned disengaging said drive wheel mount on that side;
   c. a powered drive shaft means having a drive shaft rotatably mounted on the frame and having end portions extending therefrom, said end portions having friction means mounted thereon to frictionally engage said drive wheels when said drive wheels are in a driving position;
   d. a forward drive means having a variable speed pulley mounted on said drive shaft, a first idler pulley mounted on the frame, a first drive belt connecting said variable speed pulley, first idler pulley, and the power means, and a first lever means connected to said first idler pulley to engage said first idler pulley when in use;
   e. a reverse drive means having a drum portion being part of said variable speed pulley, a second idler pulley mounted on the frame and adjacent to said drum portion, and a second drive belt connecting said second idler pulley and the power means, and a second lever means connected to said second idler pulley to engage said second drive belt with said drum portion when in use; and
   f. said drive shaft operatively connected to the power means, the vehicle being constructed and adapted to in operation when said steering means is turned, said drive wheel on the inside of the turn is disengaged from said drive shaft, and both of said drive wheels engaged with said drive shaft when the vehicle is not turning.

2. The vehicle and drive means of claim 1, wherein:
   a. said steering wheel means has a single steering wheel mounted on the front end portion of said frame means, and
   b. said frame means has a seat thereon for a rider.

3. The vehicle and drive means of claim 1, wherein said friction means has a pair of spirally disposed members rigidly secured to the outer end portions of each end of said drive shaft, said spirally disposed members in use contacting the peripheral portion of said drive wheels.

4. The vehicle and drive means of claim 1, wherein:
   a. said vehicle is a lawnmower having a blade means mounted on said frame, below a center portion of said vehicle, and
   b. said blade means has a blade drive means connected to said power means for in use operating said blade means, and
   c. said frame means has a seat thereon for a rider.

5. The vehicle and drive means of claim 4, wherein:
   a. said blade means is a rotary blade means having a horizontally-disposed rotatable blade enclosed in a housing, and
   b. said steering wheel means has a single wheel mounted on the front end portion of said frame means.

* * * * *